United States Patent [19]

Bach et al.

[11] 4,041,088

[45] Aug. 9, 1977

[54] RECIRCULATION TELOMERIZATION PROCESS AND ITS LIQUID TELOMERS AND LIQUID TELOMERS PRODUCED THEREBY

[75] Inventors: Ricardo O. Bach; Robert C. Morrison, both of Gastonia, N.C.

[73] Assignee: Lithium Corporation of America, Gastonia, N.C.

[21] Appl. No.: 739,484

[22] Filed: Nov. 8, 1976

[51] Int. Cl.$^2$ .............................................. C07C 15/02
[52] U.S. Cl. ........................... 260/668 B; 260/669 P; 526/75; 526/88; 526/173; 23/271 P; 23/288 A
[58] Field of Search .............. 260/668 B, 668 R, 669, 260/88 B; 526/88, 173, 75

[56] References Cited

U.S. PATENT DOCUMENTS

| 2,064,317 | 12/1936 | Oxley et al. | 23/288 A |
|---|---|---|---|
| 2,884,468 | 4/1959 | Young | 526/75 |
| 2,984,691 | 5/1961 | Fotis | 260/668 B |
| 3,297,793 | 1/1967 | Dollinger | 260/879 |
| 3,300,458 | 1/1967 | Manyik et al. | 526/75 |
| 3,388,178 | 6/1968 | Kamienski | 526/173 |
| 3,458,586 | 7/1969 | Langer | 260/668 B |
| 3,468,970 | 9/1969 | Screttas | 260/668 B |
| 3,678,121 | 7/1972 | McElroy et al. | 526/48 |
| 3,691,241 | 9/1972 | Kamienski et al. | 260/668 B |
| 3,751,501 | 8/1973 | Kamienski et al. | 260/668 B |
| 3,780,139 | 12/1973 | Sutter et al. | 526/88 |

Primary Examiner—Veronica O'Keefe

Attorney, Agent, or Firm—Wallenstein, Spangenberg, Hattis & Strampel

[57] ABSTRACT

Recirculation process and apparatus for the preparation of normally liquid telomers derived from the reaction of a gaseous taxogen with a solution in a liquid telogen, such as toluene, of an organometal telomerization initiator, such as a mixture or complex of n-butyllithium and potassium t-butoxide, in a container, wherein a controlled stream of the gaseous taxogen is continuously passed through fine apertures, as in a screen, into the liquid telogen solution of said initiator while said telogen solution is passed from said container through a reaction zone in a reaction chamber, whereby to produce the normally liquid telomer, and, thereafter, said liquid telomer is continuously returned to commingle with the solution in the container of said telogen and initiator, and continuously recirculating the contents of said container into said reaction zone for further reaction with said gaseous taxogen until the desired concentration of liquid telomer is produced. The process is most desirably carried out in a controlled manner to prevent any undesirable excess of the taxogen from accumulating during the chain transfer step of the telomerization process. The process also results in the production of novel liquid telomers or liquid telomers having novel and advantageous properties in relation to otherwise generally similar liquid telomers heretofore known to the art.

17 Claims, 1 Drawing Figure

U.S. Patent      Aug. 9, 1977      4,041,088

Figure 1:
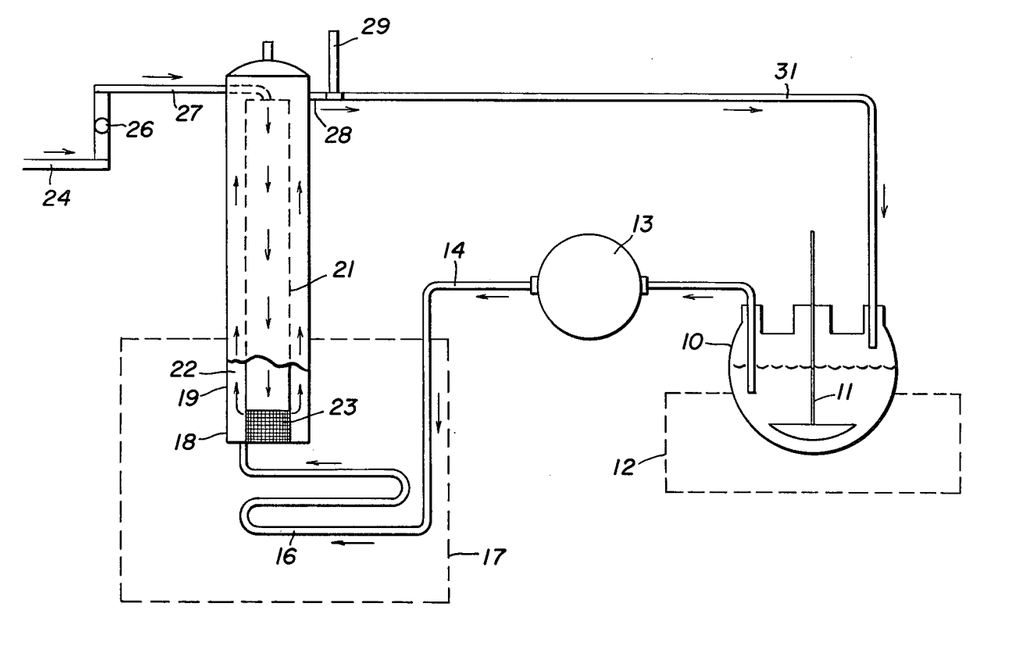

RECIRCULATION TELOMERIZATION PROCESS AND ITS LIQUID TELOMERS AND LIQUID TELOMERS PRODUCED THEREBY

Our invention relates to a novel continuous recirculating process, and apparatus for simply and effectively carrying out such process, for the preparation of normally liquid, that is liquid at room temperatures of the order of 20° to 25° C (or somewhat lower or somewhat higher temperatures), resinous telomers, in which the essential reactants utilized are (1) a normally liquid telogen, (2) a normally liquid organic solvent (which may be the telogen itself in which case no separate organic solvent is utilized, or, if not the telogen itself, then a non-reactive, generally liquid hydrocarbon, organic solvent in which the telogen is soluble), (3) an organometal telomerization initiator or catalyst which is soluble in the telogen or telogen solution, and (4) a taxogen in gaseous form. These reactants are reacted in a manner and under such conditions as to provide a novel continuous recirculation process for the production of the desired normally liquid telomers, resulting in novel telomers having a number of distinct improvements and advantages in relation to the properties or the normally liquid telomers, and in relation to processes of preparation of said telomers and apparatus for such production when comprared with practices and knowledge heretofore existent in the art.

Normally liquid resinous telomers (sometimes the term "telomers" is generically characterized in the prior art as "polymers") produced by reactions of liquid telogens with gaseous polymerizable monomeric taxogens in the presence of organometal telomerization initiators or catalysts have been known to the art, as is shown by such illustrative U.S. Patents as U.S. Pat. Nos. 3,356,754; 3,678,121; 3,691,241; 3,751,501 and 3,760,025, and procedures utilized for the production of the normally liquid telomers thereof are fully shown and described therein.

Our present invention is generic insofar as it concerns the utilization of the aforesaid essential ingredients in reactions for the production of normally liquid telomers, the bases of our invention residing, among other things, in the manner of and means for carrying out the reaction or reactions for producing said normally liquid telomers employing the procedures and apparatus described below and utilizing the novel principles reflected thereby, and it also resides in improvements in the normally liquid telomers which are produced by the carrying out of said procedures. In its narrower and preferred embodiments, our invention is concerned more particularly with improvements over the inventions disclosed in the aforesaid U.S. Pat. Nos. 3,678,121 and 3,751,501.

In general, said U.S. Pat. Nos. 3,678,121 and 3,751,501 disclose, among other telomers, the production of certain novel telomeric normally liquid polybutadiene oils and processes for preparing them, said telomeric oils being characterized by containing, in the molecules thereof, one benzene ring per polymer chain, and which represent products which can be made to possess widely different physical and chemical properties which are achieved by carrying out the processes for their production under certain particular controlled conditions. In general, the procedures of said two patents involve, illustratively, the gradual addition of a monomer in gaseous form, such as 1,3-butadiene, to a liquid telogen, such as toluene, or to an organic solvent solution of such liquid telogen, in the presence of an organolithium initiator or catalyst combination exemplified by the following:

a. An organolithium, such as n-butyllithium or dilithioisoprene, combined or complexed with an aliphatic tertiary diamine, such as N,N,N',N'-tetramethylethylenediamine, or b. An organolithium, such as n-butyllithium, combined or complexed with another organoalkali metal, such as n-butylsodium or n-butylpotassium, optionally combined or complexed with an aliphatic tertiary diamine, such as N,N,N',N'-tetramethylethylenediamine.

The reaction, as disclosed in said patents, may be carried out at various temperatures, but, most preferably, in the range of 25° C to 90° C, depending on the desired viscosity and molecular weight of the final telomeric product. Generally, the reaction is carried out in a batchwise manner, the 1,3-butadiene in gaseous form being gradually added to the mixture of toluene, organic solvent and organolithium initiator, no attempt being made to separate the processes of chain transfer and polymerization, said processes proceeding simultaneously throughout the 1,3-butadiene addition. The said 1,3-butadiene addition must be carried out gradually to prevent explosive or uncontrolled polymerizations from occurring and also to permit the formation of a more or less uniform product, (molecular weight distribution in the range of 2–4) or low molecular weight, generally in the range of about 500 to 5000 and in a relatively high yield, based on the amount of initiator or catalyst complex employed, generally of the order of 50–150 pounds per gram equivalent of carbon-metal bond.

Continuous processes for the production of polymers have heretofore been proposed among which, by way of illustration, is that shown in U.S. Pat. No. 3,297,793 for producing block copolymers of dienes and vinyl aromatic compounds where (a) a stream of a conjugated diene, such as 1,3-butadiene, (b) a stream of an organolithium initiator, such as n-butyllithium, and (c) at least one diluent stream, such as n-pentane, are continuously introduced into a prereaction zone in a prereactor wherein polymerization is initiated, then passing the resulting prereacted mixture into a reaction zone in a reactor and introducing into said mixture a stream of a vinyl-substituted aromatic compound, such as styrene, and recovering from the effluent from the latter zone a solid, rubbery block polymer of the said conjugated diene and said vinyl-substituted aromatic compound. The continuous recirculation process of our invention for the production of normally liquid telomers is radically distinguished from the process of U.S. Pat. No. 3,297,793 in a number of respects including the fact that out process is concerned with the production of normally liquid telomers, and no prereaction mechanism such as that disclosed in said patent is involved because, in our process, initiation takes place instantaneously, or essentially so, on contact of the reactants.

In U.S. Pat. No. 3,780,139, a continuous polymerization process is disclosed for the production of solvent-free segment copolymers of conjugated 1,3-dienes and aromatic vinyl compounds and wherein, for instance, a mixture of 1,3-butadiene, styrene, and an organolithium initiator is first prepared and gradually and continuously fed into a certain type of screw extruder while continuously removing said segment copolymers from the extruder at a rate commensurate with the rate of the feed. Again, this approach not only differs very substantially from that involved in our invention but is, indeed, inconsistent with the concepts and principles involved in our invention. Wholly apart from the fact that U.S. Pat. No. 3,780,139 does not involve the preparation of normally liquid telomers, a special premixing step and apparatus therefor are used in the practice of the patented invention. In our process, wherein normally liquid telomers are produced, gaseous monomer is fed directly into the initiator-liquid telomer stream to effect instantaneous, or essentially instantaneous, reaction to produce telomer, which is, of course, not the situation in the case of U.S. Pat. No. 3,780,139, over and above the further fact that our process and apparatus are not disclosed in or suggested by said patent, and the normally liquid telomers obtained in the practice of our invention would be wholly unobtainable by attempting to follow the procedure or to use the apparatus of said patent.

In the practice of the continuous recirculation process of our invention, the chain transfer (or transmetalation) and the polymerization phases involved in the production of the normally liquid telomers are isolated to a large extent. In other words, the metalation of the telogen is first effected by means of the organometal initiator, particularly an organolithium, and then the resulting metalated telogen is reacted with the taxogen in gaseous form to bring about chain transfer and polymerization of the conjugated diene and/or vinyl-substituted aromatic compound. This advantageously permits effective control of each phase of the process to enable production of the normally liquid telomers with a narrower molecular weight distribution than is obtainable in telomers using the same reactants in the same proportions but employing the batch type procedures described above in the aforementioned U.S. Pat. Nos. 3,678,121 and 3,751,501. Thus, by way of illustration, utilization of the process of our present invention permits, in certain instances, the production of normally liquid telomers having a molecular weight of, say, substantially 4,000, as against the production of normally liquid telomers having a molecular weight of, say, 20 or 30 or 40% lower according to the batch type processes of U.S. Pat. Nos. 3,678,121 and 3,751,501, but wherein the viscosity of the higher molecular weight normally liquid telomer made according to our invention is about the same or only little greater than that of the otherwise corresponding lower molecular weight normally liquid telomer made according to said U.S. Pat. Nos. 3,678,121 and 3,751,501. In the same vein, liquid telomers made by our continuous recirculation process and having a given molecular weight, say 4000, when compared with a generally corresponding batch-prepared liquid telomer having the same or essentially the same molecular weight, show a very substantially lesser viscosity than the batch-prepared liquid telomer, commonly of the order of ⅓ to 1/10 that of the batch-prepared liquid polymer.

The practice of our present invention has other advantages over prior known batch type procedures, such as are disclosed in U.S. Pat. Nos. 3,678,121 and 3,751,501, in that it commonly results in producing very substantially greater yields of desired normally liquid telomers per unit time of operation than the yields obtained in such prior type processes. This, and still other advantages of our invention, will be brought out in further detail below.

Our invention and the principles involved therein can perhaps best be understood in connection with a consideration of the accompanying drawing which shows, schematically, one illustrative embodiment of a simplified arrangement of apparatus in which our process can readily and conveniently be carried out. As shown, it utilizes a unit reactor or contacting unit and one container in which the liquid telogen and the initiator are placed and intermixed, as will be described below, but it will be understood that, for instance, instead of one reactor or contactor more than one can be used.

In the accompanying drawing which will be discussed below and in connection with our continuous recirculation process, it will, of course, be understood, as has been stated above, that it is schematic or diagrammatic in nature, such items as various valves, pressure gauges, and other construction elements and the like have been omitted in the interest of simplicity and because those skilled in the art can readily construct the apparatus in light of what is actually shown and described. The embodiment shown in the drawing resides in the reactor or contacting unit combination with the container and arrangements and the continuous recirculation process is described in connection with such embodiment. While, hereafter, the drawing will be described in relation to the utilization therein of particular reactant ingredients, other reactant ingredients of the nature disclosed herein can be employed to effect the production of other normally liquid telomers.

Referring, now, to the drawing, it shows a vessel or container 10 provided with an agitator or stirring means 11, advantageously for continuously stirring the contents therein, and a cooling bath 12 for cooling the contents of the container 10. The container 10 serves to hold a solution of the telogen, for instance, liquid toluene, as such or dissolved in a liquid hydrocarbon, for instance, n-hexane, and the organometal initiator or catalyst, for instance, a complex of n-butyllithium and potassium t-butoxide, with or without supplemental ingredients as, for instance, tetramethylethylenediamine (TMEDA). The initial metalation of the liquid telogen takes place in said container 10. A metering pump 13 pumps the telogen solution at a controlled rate through an inlet pipe 14 and then through a preheater conduit or preheater tubes 16, disposed in a constant temperature bath 17, and thence into the lower end or bottom of a reactor or contacting unit 18. The reactor 18 is conveniently made up of a cylindrical tube 19 within which is disposed, centrally or concentrically within tube 19, another or inner cylindrical tube 21 whereby to provide an annular space 22 between the inner wall of cylindrical tube 19 and the outer wall of cylindrical tube 21 through which annular space 22 the liquid previously metalated telogen solution flows upwardly. The tubes 19 and 21 may conveniently be made of stainless steel or glass or any other material which is corrosion resistant and inert to the ingredients with which they are in contact. The cylinder 21 is provided, preferably adjacent the bottom thereof, with a perforated section 23 having very fine apertures therein through which the gaseous taxogen may diffuse or pass, essentially as a stream, as hereafter described, to commingle thoroughly with the liquid telogen solution flowing upwardly in the annular space 22. The perforated section 23 may, and preferably does, extend around the entire circumference of the tube 21 and extends upwardly some distance from its lowermost or generally lower end, which distance is variable but, generally, is quite short, preferably about 1/10 to about 1/12 the height of the tube 21.

The perforations or apertures or openings in the perforated section 23 may vary somewhat in size or diameter but it is particularly preferred that they have a diameter in the range of about 2 to about 40 microns although the micron diameters can be greater, the objective being to enable the gaseous taxogen to diffuse through the perforations in the form of, in effect, a highly diffused stream-like gas for intimate contact with the upwardly flowing stream of previously metalated liquid telogen. An alternative manner of providing a cyclindrical tube 21 with fine apertures or openings at the lower end section is to utilize a commercial microscreen porous cylindrical element, such as is used in industrial filters, and blank off or wrap around or block off the upper part thereof in any suitable manner to render said upper part impervious to the passage of the gaseous taxogen therethrough, leaving the lower part, to a suitable height or length, to provide the finely perforated or apertured section 23 through which the gaseous taxogen passes into the upwardly flowing body of previously metalated telogen solution in the annular space 22. The cylindrical tubes 19 and 21 are supported at their lower ends on a base member, as shown, in fluid-tight relation by welding, sealing or other suitable or convenient means.

The gaseous taxogen, for instance, 1,3-butadiene, is admitted under pressure through a manifold 24 and passes through flow meter 26 through a pipe 27 into the upper part of tube 21, then downwardly in the tube 21 from which it then issues or diffuses through the finely apertured section 23 directly into the upwardly flowing liquid telogen body or stream and is abosrbed into the telogen stream and proceeds to react with the liquid telogen. The liquid telogen body or stream intimately intermingles with the gaseous taxogen continuously moving upwardly to the top of the annular space 22 in the reactor and passes through outlet pipe 28 into contact with a thermometer 29 and thence continues to move through a conduit 31 back into container 10. The arrangement and sizing of the equipment are such that, when the liquid telogen and gaseous taxogen reaction mixture have reached the top of the reactor and move past the thermometer 29, and probably somewhat before, reaction of the 1,3-butadiene has occurred totally, or essentially totally, in regard to chain elongation. The arrangement and length of the conduit 31 are such that, in the course of passage through the conduit 31, at least a substantial amount of transmetalation of polymer to liquid telomer occurs. The metalation or lithiation of the telogen again occurs in the container 10 and, as recirculation through the reactor takes place, the process of chain elongation is repeated. The processes of transmetalation and polymerization (or chain elongation) are repeated, respectively, as recycling to the container and passage to and through the reactor occur with continuous feeding of gaseous taxogen to the reaction zone in the reactor being effected. In other words, as the metalated telogen contacts or is contacted with the gaseous taxogen, polymerization or telomerization occurs in the annular space 22, the polymerizate or telomer is recirculated to container 10 where transmetalation of the formed polymer or telomer to the telogen takes place and recirculation is continued until the desired amount of telomer is produced.

Some additional observations, however, appear to be in order so that an even more complete understanding of our recirculation process and our invention may be had. The admittance of the gaseous taxogen is maintained constant, or essentially so, in the reactor unit or units. The process is most advantageously carried out to maintain a constant or essentially constant initiator or catalyst to gaseous taxogen monomer ratio throughout the process and thus to regulate the molecular weight of the resulting liquid telomer (as well as its molecular weight distribution). Suitable procedures of termination, washing and solvent stripping of the telomer stream can be made a part of the present system, such that finished product in the form of the liquid telomer may be collected and packaged directly.

Temperatures of the chain elongation and transmetalation parts of the system may be varied widely to achieve any particularly desired physical properites; however, it is generally found best to maintain the temperatures of both parts approximately the same. Temperatures may be varied from about 25° C to 110° C, and most advantageously between 45° and 75 ° C. As indicated above and in the drawing, convenient means can be employed for purposes of temperature control, whether heating or cooling.

Although the process may be conveniently carried out at atmospheric autogenous pressures, the system may readily be adjusted to operate under pressures in excess, and well in excess, of atmospheric pressure if desired.

Many different ingredients can be used as the telogens for the production of the liquid telomers in accordance with the present invention. The term "telogen" as used herein is employed in the same sense and with the same meaning as is set forth in the aforesaid U.S. Pat. No. 3,751,501, namely, an aromatic compound, notably an aromatic hydrocarbon, having at least one active hydrogen in a side chain capable of being replaced by a metal atom, particularly lithium, but devoid of any other substitutents as, for instance, hydroxyl, chlorine, bromine, iodine, carboxyl, and nitro, which substituents are reactive with the organolithium compositions or complexes which are utilized as catalysts, Illustrative examples of such useful telogens are $C_1$-$C_4$ mono-, di- and trialkyl benzenes exemplified by toluene, ethylbenzene, n-propylbenzene, isopropylbenzene, o-, m- and p-xylenes; 1,3,5-trimethylbenzene; n-, s- and t-butylbenzenes; cyclohexylbenzene; alkyl, notably $C_1$-$C_4$ and cycloalkyl substituted polycyclic aromatic compounds exemplified by 1,2,3,4-tetrahydronaphthalene, 1-methylnaphthalene, 1-isopropylnaphthalene, 1,3-isobutylnaphthalene, and 1-cyclohexylnaphthalene; alkoxyaromatic compounds exemplified by anisole; 1,3-dimethoxybenzene; monopropoxybenzene; 1-methoxynaphthalene and 1,3-dimethoxynaphthalene; dialkylamino-aromatic compounds, notably those in which the alkyl is $C_1$-$C_4$, exemplified by dimethylaminobenzene; 1,3-bis-(di-isopropylaminobenzene) and 1-dimethylaminonaphthalene.

The taxogens which are utilized in the production of the normally liquid telomers which are made pursuant to the present invention include, illustratively, polymerizable monomeric dienes amd polymerizable vinyl-substituted aromatic compounds, which advantageously contain from 4 to 12 carbon atoms, typical examples of which are isoprene, 1,3-butadiene, 2-methyl-1,3-butadiene; 2,3-dimethyl-1,3-butadiene; styrene; alpha-methylstyrene, 1,4-divinylbenzene; 1-vinylnaphthalene and 2-vinylnaphthalene Numerous other examples can also be used, many of which are shown, for instance, in U.S.

Pat. No. 3,091,606 which, for this showing, is herewith incorporated by reference.

The taxogen is contacted in gaseous form with the metalated telogen which is in the form of a liquid as such or in the form of a solution in an inert organic solvent, commonly a liquid hydrocarbon solvent. Illustrative of such solvents are n-heptane, n-hexane, n-octane, isooctane, cyclohexane, methylcyclohexane, benzene, etc., and compatible mixtures of any two or more thereof.

The organometals which are utilized as initiators or catalysts in the practice of the continuous process of producing normally liquid telomers in accordance with our invention can be selected from wide groups at least most of which are, per se, known to the art as initiators or catalysts in telomerization and polymerization reactions. Many of them are complexes which are formed in organic solvent solutions or, in use, are dissolved in organic solvent solutions, particularly liquid hydrocarbon solutions. Among said initiators or catalysts are $C_2$–$C_{18}$ alkyllithiums, or other organolithiums listed below, used either alone or in admixture with alkylmetals of at least one of the metals sodium, potassium rubidium and cesium, particularly sodium and potassium and, in certain cases, especially potassium.

Illustrative of the organometals used as such, or in the form of complexes, are (a) $C_3$–$C_6$ alkyllithiums in admixture with (b) $C_3$–$C_6$ alkylmetals in which the metals of said alkylmetals are one or more from groups of sodium, potassium, rubidium and cesium, especially the n-butylmetals. However, in one aspect of the broader phases of the invention, the organometals employed in the production of the compositions or complexes or the like utilized in the practice of the present invention can comprise $C_2$–$C_{18}$ hydrocarbon organo radicals, said organo radicals being, for instance, cycloalkyl, cycloalkenylalkyl, arylalkyl, arylcycloalkyl, cycloalkylaryl, arylcycloalkyl, and the like. Still other types of organo radicals that can be used are those of heterocyclic character, such as 2-pyridyl and 2-thienyl; ethylenically unsaturated organo radicals such as vinyl, allyl and propenyl; polyfunctional organo radicals such alkylene and polymethylenes, as for example, 1,4-tetramethylene and 1,5-pentamethylene, and those derived by addition of alkali metals and alkyllithiums to conjugated polyene hydrocarbons such as isoprene, 1,3-butadiene and 1,3-divinylbenzene (see, for instance, U.S. Pat. Nos. 3,294,768; 3,388,178 and 3,468,970). Many of the said organometals which are utilized to produce the compositions or complexes can be represented by the formula where R and $R^1$ are the same or dissimilar $C_2$–$C_{18}$ hydrocarbon organo radicals; Me is one or more metals selected from the group of sodium, potassium, rubidium and cesium; $x$ and $y$ are integers reflecting the molar ratios of the respective organometals comprising the compositions or complexes, the values of $x$ and $y$ commonly involved being indicated hereafter; and $a, b, c$ and $d$ are integers, generally from 1 to 3. Illustrative examples of said hydrocarbon organo radicals, in addition to those previously mentioned, are n-propyl; n-butyl; s-butyl; n-amyl; t-amyl; n-octyl; n-undecyl; n-decyl; n-dodecyol; 2-methyl-2-butenyl; cyclopentyl-methyl; cyclohexyl-ether; cyclopentyl-ethyl; methylcyclopentylether; 4-cyclohexenyl-ether; alphanaphthylethyl; cyclopentyl; cyclohexyl; methylcyclopentyl, dimethylcyclopentyl; ethylcyclopentyl; methylcyclohexyl; dimethyl-cyclohexyl; ethylcyclo-hexyl; isopropylcyclohexyl; phenylethyl; phenylcyclohexyl; phenyl; tolyl; xylyl; benzyl; naphthyl; methylnaphthyl; dimethylnaphthyl; ethylnaphthyl; cyclohexylbutyl; 2,7-dimethylocta-2,6-dien-1,8-yl; 2,6-dimethylocta-1,6-dien-1,8yl; and bis ($\alpha$-2-methylbutyl)-m-xylyl. Still other initiators or catalysts useful in the practice of our present invention are $R_2MgNa$ (made by admixing $MgCl_2$, NaO—Bu-t, BuLi); $R_2Mg$ $(RNa)_3$ (made from $MgCl_2$, NaO Bu-t, BuLi); $R_3MgK$ (made from $MgBr_2$, t-BuOK, BuLi); $4RLi + 2NaOt-Bu + MgCl_2$, wherein the $MgCl_2$ and $MgBr_2$ is advantageously initially activated, and R is lower alkyl.

The compositions or complexes can be of binary character as in the case, for example, of n-butyllithium-n-butylsodium or n-butyllithium-n-butylpotassium; or of ternary character, as in the case, for example, of n-butyllithium-butylsodium-n-butylpotassium or n-butyllithium-n-butylpotassium-n-butylcesium. Compositions or complexes of quaternary character can also be utilized.

The initiators or catalysts can also be used in the form of polymetallo, particularly polylithio, hydrocarbon compounds, illustrative of which, in the case of the polylithio hydrocarbon initiators or catalysts, are dilithioisoprene; dilithiobutadiene; 2,4-dilithio, 2,4-diphenylhexane; 1,4-dilithio-1, 1, 4, 4-tetraphenyl-butadiene and 1,8-dilithio-2,3,6,7-tetramethyl-octa-2,6-diene, and other dilithio adducts of other polyene hydrocarbons as shown, for instance, in U.S. Pat. No. 3,388,178 the disclosure with respect thereto being herewith incorporated by reference. Still other polylithio hydrocarbons which can be used are alkylene dilithiums such as 1,4-dilithiobutane; 1,5-dilithiopentane; 1,6-dilithiohexane, as well as such dilithio compounds as 4,4-dilithiobiphenyl. Polylithio hydrocarbons in which there are 3 or 4 lithiums in the molecule are shown, for instance, in U.S. Pat. No. 3,377,404 the disclosure of which with respect thereto is herewith incorporated by reference. As shown in said U.S. Pat. No. 3,377,404 the polylthioorganics therein described can be identified by the formula $RLi_x$ where $x$ is an integer from 2 to 4, and R is a hydrocarbon radical selected from the group consisting of aliphatic, cycloaliphatic and aromatic radicals. It is especially desirable to utilize dilithio adducts of such conjugated polyene hydrocarbons as isoprene and 1,3-butadiene in those instances in which the initiator or catalyst selected for use is a di-or poly-lithio hydrocarbon compound.

The soluble metalorganic complexes referred to above comprise composition in which the organolithium to (other) organoalkali molar ratios may vary considerably depending on the nature of the organoradicals involved. Generally, these ratios will vary from about 2:1 to about 10:1 for complexes containing alkyl groups such as n-butyl-, s-butyl-, or n-amyl-, but may be as high as about 100:1, 500:1 and even as high as about 1000:1 for complexes containing one or two organo groups derived from the addition of alkali metals to conjugated polyenic hydrocarbons such as 1,3-butadiene or isoprene. Especially preferred ratios utilized are those in which the molar ratios of organolithium to other organoalkali vary from about 3:1 to about 10:1.

It is also desirable, in certain instances, to utilize, in the reaction medium in which the telomers of the pre- sent invention are produced, certain types of catalysts, namely, Lewis base ethers and aliphatic tertiary amines. Illustrative examples of such ethers are linear alkyl ethers such as dimethyl ether, diethyl ether, diisopropyl ether, di-n-butyl ether and diisobutyl ether; dialkyl ethers of aliphatic polyhydric alcohols such as dimethyl ether of ethylene glycol, diethyl ether of ethylene glycol, diisopropyl ether of ethylene glycol and diisopropyl ether of diethylene glycol, and dimethyl-, diethyl- and diisopropyl ethers of propylene glycol; cyclic alkyl ethers such as tetrahydrofuran (THF), tetrahydropyran (THP), dioxane, and 7-oxa [2,2,1]bicycloheptane (OBM); and liquid ethers in the form of azaoxa-alkanes, azo-alkyloxacycloalkanes or oxa-alkylazacycloalkanes which can be represented by the formulae:

where R¹, R² and R³ are the same or different alkyls each containing from 1 to 4 carbon atoms, namely, methyl, ethyl, n-propyl, isopropyl, n-butyl, isobutyl and t-butyl; X is a non-reactive group as —CH$_2$CH$_2$—; —CH$_2$—CH$_2$—CH$_2$, or other divalent aliphatic hydrocarbon or alkylene radicals, preferably containing from 2 to 4 carbon atoms; and w is 1 to 4. Illustrative examples of such ethers include, for instance, 2-dimethylaminoethylmethyl ether [(CH$_3$)$_2$—N—CH$_2$—CH$_2$—O—CH$_3$]; 2-dimethylaminoethylmethyl ether [(C$_2$H$_5$)$_2$—N—CH$_2$.—CH$_2$)—CH$_3$]; and 2-dimethylaminopropylmethyl ether [(CH$_3$)$_2$—N—CH$_2$—CH$_2$—CH$_2$—O-CH$_3$]An illustrative dioxacycloalkane is 2,2'di (tetrahydrofuranyl)

The Lewis base aliphatic tertiary amines include, by way of illustration, trimethylamine, triisopropylamine; and ditertiary amines such as N, N,N,', N'-tetramethylenediamine. Other suitable Lewis base tertiary amines which can be utilized are disclosed in U.S. Pat. Nos. 3,206,519 and 3,451,988 which, for this showing, are herewith incorporated by reference. Especially suitable, where such cocatalyst is used, are N,N,N',N'-tetramethylethylene-diamine (TMEDA) and 1-dimethylamino-2-ethoxyethane (2-dimethylaminoethyl ethyl ether).

The following examples show illustrative runs in accordance with our invention in the apparatus shown in the foregoing attached drawing. It will, of course, be understood that numerous other normally liquid resinous telomers can be made utilizing different telogens, different taxogens different metalorganic initiators or catalysts, proportions of reactants, etc. without departing from the guiding principles and teachings disclosed herein. It will also be understood that such materials as oxygen, carbon dioxide and water, as contaminants or otherwise, as well as other certain materials, are significantly detrimental or destructive to the carrying out of the production of the liquid telomers. Hence, such materials should be removed from the reactants, which can be done by known procedures, and should be kept out of the system in which the desired reactions are taking place in the practice of our recycling process. All temperatures recited are in degrees Centigrade.

EXAMPLE 1 a. Ingredients Utilized 9.6 g conc. n-butyllithium (0.15 moles)
17.3 g TMEDA (0.15 moles) distilled from n-butyllithium
1800 ml Toluene—distilled from n-butyllithium
Gaseous 1,3-butadiene b. Procedure

The toluene, TMEDA, and n-butyllithium are premixed in the container 10 which is preheated to about 60°. By means of the metering pump 13 the reaction medium is recirculated throughout the entire system 19 times at a rate of 295 ml/min (2 hours). The 1,3-butadiene is consumed at a rate of 205/min. to yield 2515 g of liquid telomer. The reaction temperature (81°) is controlled by partially immersing the telomerization unit in a constant temperature bath (23°). The sample is terminated and washed twice with methanol (equal volumes of liquid telomer and methanol). The telomer layer is then dried under vacuum. A clear liquid telomer is obtained as the final product. Its physical properties are as follows:

| c. Physical Properties | |
|---|---|
| Mn (VPO) | = 2300 |
| Viscosity (Poise at 25° C) (Engler) | = 724 |
| Volatiles % | = None* |
| Base No. (Mg KOH/g) | = 0.1 |
| Microstructure (I.R.) | = 52% Vinyl |
|  | 12% Trans |
|  | 36% Cis and Sat |
| MWD (GPC) | = 1.5 |

*Wt. Loss at 200° C, 5 minutes, in air.

EXAMPLE 2 a. Ingredients Utilized

Same as in part (a) of EXAMPLE 1 b. Procedure

Same as in part (b) of EXAMPLE 1 except that the medium flow rate is 790 ml/min., the medium is recirculated 17 times, and the 1,3-butadiene is consumed at a rate of 19.2 g/min. to yield 2166 gms of the liquid telomer.

c. Physical Properties

| | | |
|---|---|---|
| Mn (VPO) | = | 1200 |
| Viscosity (Poise at 25° C) (Engler) | = | 113 |
| Volatiles % | = | 0.87* |
| Base No. (Mg KOH/g) | = | 1.4 |
| Microstructure (I.R.) | = | 47% Vinyl |
| | | 14% Trans |
| | | 39% Cis and Sat |

*Wt. loss at 200° C, 5 minutes, in air.

EXAMPLE 3 a. Ingredients 11.8 g conc. n-butyllithium (0.185 moles)
3.45 g potassium t-butoxide
1800 ml Toluene —distilled from n-butyllithium
Gaseous 1,3-butadiene b. Procedure

The toluene, potassium, t-butoxide and n-butyllithium are premixed in container 10 which is preheated to about 68°. By means of the metering pump 13 the reaction medium is recirculated throughout the entire system seven times. The initial pump setting is 120 ml/min. This setting is increased by 20 ml/min. every 10 minutes in order to compensate for the volume increase due to the formation of telomer. The 1,3-butadiene is consumed at a rate of 20.7 g/min. and yields 2074 g of liquid telomer. The reaction temperature is controlled at about 70°.

c. Physical Properties

| | | |
|---|---|---|
| Mn (VPO) | = | 2000 |
| Viscosity (Poise at 25° C) (Engler) | = | 22 |
| Volatiles | = | None* |
| Base No. (Mg KOH/g) | = | <0.1 |
| Microstructure (I.R.) | = | 37% Vinyl |
| | | 33% Trans |
| | | 30% Cis and Sat |
| MWD (GPC) | = | 1.26 |

*Wt. loss at 200° C, 5 minutes, in air.

EXAMPLE 4 a. Ingredients Utilized 9.6 g conc. n-butyllithium (0.15 moles)
5.32 g potassium t-butoxide (0.048 moles)
1800 ml Toluene — distilled from n-butyllithium
Gaseous 1,3-butadiene b. Procedure

The procedure is the same as EXAMPLE 3 except that the reaction temperature is 72° and the 1,3-butadiene is consumed at a rate of 19 g/min. to yield 2020 g of liquid telomer.

c. Physical Properties

| | | |
|---|---|---|
| Mn (VPO) | = | 1400 |
| Viscosity (Poise at 25° C) (Engler) | = | 16 |
| Volatiles % | = | 0.04* |
| Base No. (Mg KOH/g) | = | <0.1 |
| Microstructure (I.R.) | = | 43% Vinyl |
| | | 31% Trans |
| | | 26% Cis and Sat |
| MWD (GPC) | = | 1.56 |

*Wt. loss at 200° C, 5 minutes, in air.

EXAMPLE 5 a. Ingredients Utilized 9.6 g conc. n-butyllithium (0.15 moles)
7.1 g potassium t-butoxide (0.063 moles)
1800 ml Toluene — distilled from n-butyllithium
Gaseous 1,3-butadiene b. Procedure

The procedure is the same as Example 3 except that the 1,3-butadiene is consumed at a rate of 18.2 g/min. to yield 2061 g of liquid telomer.

c. Physical Properties

| | | |
|---|---|---|
| Mn (VPO) | = | 1000 |
| Viscosity (Poise at 25° C) (Engler) | = | 9.5 |
| Volatiles % | = | 1.2* |
| Base No. (Mg KOH/g) | = | <0.1 |
| Microstructure (I.R.) | = | 41% Vinyl |
| | | 26% Trans |
| | | 33% Cis and Sat |
| MWD (GPC) | = | 1.54 |

*Wt. loss at 200° C, 5 minutes, in air.

Additional specific normally liquid telomers, which represent particularly preferred embodiments of our present invention, can be made in accordance with our recycling process, utilizing the following overall formulations or total of ingredients in the stated proportions, etc., in suitably sized apparatus:

EXAMPLE 6

| | |
|---|---|
| 193 | kg toluene |
| 623 | kg n-hexane |
| 43 | gram equivalents n-butyllithium |
| 21.5 | gram equivalents potassium t-butoxide |
| 1555 | kg 1,3-butadiene |
| | Reaction temperature 50° C |

EXAMPLE 7

| | |
|---|---|
| 864 | kg toluene |
| 42 | gram equivalents TMEDA |
| 73 | gram equivalents dilithioisoprene |
| 1591 | kg 1,3-butadiene |
| | Reaction temperature 72° C |

EXAMPLE 8

| | |
|---|---|
| 364 | kg toluene |
| 455 | kg benzene |
| 48 | gram equivalents n-butyllithium |
| 21.5 | gram equivalents potassium t-butoxide |
| 1.29 | gram equivalents nickel acetylacetonate dissolved in 45.4 kg benzene |
| 2041 | kg 1,3-butadiene |
| | Reaction temperature 50° C |

EXAMPLE 9

| | |
|---|---|
| 859 | kg toluene |
| 43 | gram equivalents n-butyllithium |
| 21.5 | gram equivalents potassium t-butoxide |

EXAMPLE 9-continued

| | |
|---|---|
| 1441 | kg 1,3-butadiene |
| 241 | kg α-methylstyrene |

A series of additional runs is made, in each case in accordance with our continuous recirculation process and with a corresponding separate run utilizing the batch type process of U.S. Pat. No. 3,751,501, with the same ingredients, the same proportions thereof, the same reaction temperatures, and the same after-treatment to recover the liquid telomers in the continuous and the batch type runs. The following Table I shows a comparison of various properties of the normally liquid telomers of the continuous recirculation telomerization runs in accordance with our invention in relation to those following the aforesaid batch type procedure.

TABLE I

| Liquid Telomer Run No. | Telomer Type | Recirculation or Batch | Mn (VPO) | Viscosity (Poise at 25°) (Engler) | MWD |
|---|---|---|---|---|---|
| 3372 | A | Recirculation | 1300 | 56 | 1.26 |
| 54 | A | Batch | 1650 | 730 | 1.66 |
| 3298 | A | Recirculation | 2300 | 724 | 1.50 |
| 53 | A | Batch | 2300 | 7000 | 1.66 |
| 3439 | P | Recirculation | 1300 | 10* | 1.39 |
| 75 | P | Batch | 1300 | 6.4** | 1.70 |
| 3420 | P | Recirculation | 2000 | 22 | 1.26 |
| 85 | P | Batch | 2500 | 70 | 1.98 |

*Wt. loss 0.35% at 200° C, 5 minutes, in air.
**Wt. loss 4.8% at 200° C, 5 minutes, in air.

The foregoing data in Table I show that, in all cases, the normally liquid telomers produced by the invention of our continuous recirculation process have a lower molecular weight distribution, commonly about 10 to about 35% lower, than those normally liquid telomers produced by the prior known batch type process using the same ingredients in the same proportions and under the same temperature conditions; as well as differences, generally, in other respects. In most cases, the lower MWD is reflected in lower viscosities. In the case of P type telomers, the high weight loss of the batch run P liquid telomers is due to an appreciable amount of very low molecular weight telomers, which explains the low viscosities in such P type liquid telomers. Commonly the viscosities of the liquid telomers, especially of the A type liquid telomers, measured in poises at 25° C (Engler), produced by the continuous recirculation process of the present invention, are from about 1/10 to about ½ those produced by the batch process utilizing the same ingredients in the same proportions and under the same temperature conditions. The nature of the A and the P type liquid telomers referred to in the above Table I and the following Tables II and III is described hereafter.

We have referred above to the fact that our invention results in the production of normally liquid telomers, particularly those which are in the form of telomeric polybutadiene oils, which are characterized by a significant reduction in the volatiles content thereof (at comparable molecular weights), in comparison with the otherwise generally corresponding liquid telomers when made by batch type processes as disclosed in such U.S. Patents as U.S. Pat. Nos. 3,678,121 and 3,751,501. An additional improvement, closely allied to that of a lower volatiles content, is the more narrow molecular weight distribution (MWD) of the liquid telomers obtained by the employment of our telomerization process as compared to the batch type process, which leads to lower viscosities at equivalent molecular weights and a greater ease in handling of such higher molecular weight products. This is shown in the following Table II:

TABLE II
COMPARISON OF BATCH vs CONTINUOUS TELOMERIZATION RUNS

| Liquid Telomer Run No. | Telomer Type | Batch or Recirculation | Volatiles(%)* | Mn (VPO) |
|---|---|---|---|---|
| 75 | P | Batch | 4.8 | 1300 |
| 3416 | P | Recirculation | 0.35 | 1300 |
| 3431 | P | Recirculation | 0.2 | 1150 |
| 3446 | P | Recirculation | 0.3 | 1450 |
| 3447 | P | Recirculation | 0.4 | 1200 |
| 3420 | P | Recirculation | None | 2000 |
| 97 | P | Batch | 1.2 | 3050 |
| 54 | A | Batch | 0.5 | 1600 |
| 3298 | A | Recirculation | None | 2300 |

*Wt. loss at 200° C, 5 minutes, in air.

The above data show not only that liquid telomers prepared via our continuous recirculation process have decidedly less volatiles than similar liquid telomers prepared by a batch type process, but, in fact, at the higher Mn liquid telomers, no volatiles are detected.

A still further and important advantage of our invention over the heretofore known batch type process, as exemplified in U.S. Pat. No. 3,751,501, centers about what we refer to here as Unit Volume Production Capacity (C) the definition of which is in weight of liquid telomer produced over time over volume of reactor capacity or in kg/hr/reactor-liter In laboratory-size equipment, in batch operations, production of certain normally liquid telomers, the C values have commonly and quite consistently overall averaged approximately 0.037 kg/hr/reactor-liter for so-called P system liquid telomers, and 0.056 kg/hr/reactor-liter for so-called A system liquid telomers. The P system liquid telomer resins, briefly stated, involve the preparation of a mixture of toluene, hexane, n-butyllithium and potassium t-butoxide into which mixture there is then passed gaseous 1,3-butadiene at a controlled rate, followed by purging the system, after the completion of the telomerization reaction, with nitrogen, and treatment with methanol to remove catalyst residues followed by stripping and recovery of the normally liquid telomers. The A system liquid telomer resins, briefly stated, involve the preparation of a mixture of toluene, TMEDA and dilithiodiisoprene into which mixture there is then passed gaseous 1,3-butadiene at a controlled rate, followed by similar steps to those referred to above in connection with the P system liquid telomer resins.

The following Table III shows data obtained in the production of normally liquid telomer resins utilizing the continuous recirculation process of the present invention carried out in laboratory-size equipment in relation to the liquid telomers of the aforesaid P and A systems:

TABLE III

| Run No. | System | Recirculation Reactor Vol (ml) | g/min of 1,3-Butadiene Absorbed | kg/hr/ reactor-liter |
|---|---|---|---|---|
| 3538 | P | 500 | 18.6 | 2.23 |
| 3343 | P | 500 | 17.2 | 2.06 |
| 3352 | P | 500 | 26.2 | 3.14 |
| 3353 | P | 500 | 21.7 | 2.60 |
| 3280 | P | 1000 | 34.0 | 2.04 |
| 3347 | A | 500 | 17.9 | 2.05 |

TABLE III-continued

| Run No. | System | Recirculation Reactor Vol (ml) | g/min of 1,3-Butadiene Absorbed | kg/hr/reactor-liter |
|---|---|---|---|---|
| 3300 | A | 1000 | 22.0 | 1.32 |

As noted above, the C value in the P liquid telomer resin system in pilot plant scale batch operation has commonly been about 0.037 kg/hr/reactor-liter.

In the continuous recirculation process of our present invention, in the production of the P liquid telomer resin system, the continuous recirculation system on the average absorbs about 25 g of gaseous 1,3-butadiene/minute/500 ml, or $$25 \times 60/500 = 3 \text{ kg/hr/reactor-liter}$$

or, in other words, the continuous recirculation system of our invention is approximately 90 times more effective and faster.

Similarly, as noted above, the C value in the A liquid telomer resin system in pilot plant scale batch operation has commonly been about 0.056 kg/hr/reactor-liter.

In the continuous recirculation process of our present invention, in the production of the A liquid telomer resin system, the continuous recirculation system on the average absorbs about 16 g of 1,3-butadiene/minute/500 ml, or $$16 \times 60 /500 = 1.92 \text{ kg./hr/reactor-liter}$$

or, in other words, the continuous recirculation system of our invention is approximately 34 times more effective and faster.

The foregoing C values have been obtained where our continuous recirculation process has been used in what is essentially laboratory size equipment. This laboratory size equipment has ranged in size, as to the reactor, in which the reactor volume or capacity or the amount of the reaction medium in the reactor 18 has, in certain cases, been about 500 ml; and, in other cases, approximately 1000 ml. In other words, the reactor-volume was the volume of the annular space 22 (in reactor 18). The diameters of the cylindrical tube 19 and the inner cylinder 21 are variable and the same is true as to the height thereof. Illustrative is a diameter of 4 to 4½ inches of the cylindrical tube 19; a diameter of 2½ to 3 inches of the inner cylinder 21; and a height of said tubes ranging from about 10 to 20 inches.

In the comparisons set forth above in arriving at the values of C, it will be understood, and as indicated, the reactor-liter (or reactor-volume) figure was arrived at by comparing the volume of the annular space in the reactor or reactors used in the continuous recirculation process with the volume of the reactor used in batch type runs according to U.S. Pat. Nos. 2,678,121 and 3,751,501. The volume of the batch reactor was the volume of the liquid phase or material at the end of the telomerization reaction. Based upon extrapolations, and also based on tests, this means that very much greater production of liquid telomers per unit of time per unit of volume of the continuous recirculation reactor are obtained than where the liquid telomers are made by a batch process. Expressed otherwise, much smaller reactor equipment volume according to the practice of our invention is required to produce the same weight of liquid telomer than where the batch production of liquid telomer is used.

It will be understood, of course, that the apparatus used for the carrying out of our continuous recirculation process can be scaled up to any reasonable extent desired within reasonable limits and consistent with established engineering principles.

Although the telomers produced, for instance, in accordance with U.S. Pat. Nos. 3,678,121 and 3,751,501 have commercial utility for a variety of purposes, as described in said patents, as generally noted above, those of said telomers which are on the low molecular weight side commonly contain a relatively appreciable percentage of volatile components arising predominantly from the somewhat broad molecular weight distributions encountered in such telomerization reactions in which both transmetalation and polymerization processes are occurring simultaneously or substantially so. Such volatile components in the liquid telomers are detrimental in processing these telomers for can or coil coating applications. The volatile components are oxidized rapidly in air during curing above 100° C, producing noxious fumes and generally contributing to pollution. In the practice of our continuous recirculation process, the telomers, and notably the telomeric polybutadiene oils which are produced, are generally characterized by a substantially lower content, commonly from about 1/10 to ½, of undesirable volatile components, than are present in liquid telomers produced by a batch process utilizing the same ingredients in the same proportions and under the same temperature conditions, the volatiles content being measured by heating the telomer at 200° C for 5 minutes, in air.

The normally liquid telomers can be made to correspond to particular molecular weights or ranges of molecular weights, particular viscosities, and of variable microstructures in order to possess properties to fill particular needs. Thus, and as disclosed in the aforementioned U.S. Pat. No. 3,751,501, for certain applications such as "potting" or "casting", liquid telomers of relatively high molecular weight, for instance, about 1500 to about 3000, are desirable to obtain good cures. On the other hand, for certain other applications, such as pollution-free paints and coatings, distinctly lower molecular weight liquid telomers, for instance, about 145 to about 460, are particularly useful since it is unnecessary to resort to the use of admixed solvents to effect lowering of viscosity. There are many other utilities for low molecular weight liquid telomers as, for instance, plasticizers for rubbers, alkylates, and the production of biodegradable synthetic detergents.

We claim:

1. In a recirculation process of producing normally liquid telogens wherein a telogen is metalated with an organometal initiator in a container and said metalated telogen is then reacted with at least one gaseous taxogen selected from the group of conjugated dienes and vinyl-substituted aromatic compounds, the steps which comprise forming and maintaining a solution of said telogen and said initiator in said container, passing said solution into the reaction zone of a reactor, continuously passing a controlled stream of said gaseous taxogen through fine apertures into said reaction zone of said reactor where it commingles with said solution of the telogen and the initiator to produce a reaction mixture containing normally liquid telomer, returning said reaction mixture to said container to commingle with the solution therein of said telogen and initiator, and recirculating the contents of said container into said reaction zone for further reaction with said gaseous taxogen passing through said fine apertures.

2. The process of claim 1, wherein said fine apertures through which the gaseous taxogen passes are in a vertically arranged tubular member, which is disposed within a vertically arranged housing in relation to said tubular member whereby commingling of said gaseous taxogen and said metalated telogen solution takes place in said housing.

3. The process of claim 2, in which the telogen is toluene and the taxogen is 1,3-butadiene.

4. The process of claim 3, in which the initiator is an organolithium.

5. The process of claim 4, in which the organolithium initiator is a complex of n-butyllithium and potassium t-butoxide.

6. The process of claim 4, in which the organolithium initiator is a complex of n-butyllithium and N,N,N',N'-tetramethylethylenediamine.

7. The process of claim 4, in which the organolithium initiator comprises a complex of dilithiodiisoprene and N,N,N',N'-tetramethylethylenediamine.

8. The process of claim 1, wherein said fine apertures having a size corresponding to a diameter in the range of about 2 to about 40 microns.

9. The process of claim 2, wherein said fine apertures having a size corresponding to a diameter in the range of about 2 to about 40 microns.

10. The process of claim 5, wherein said fine apertures having a size corresponding to a diameter in the range of about 2 to about 40 microns.

11. In a recirculation process of producing normally liquid telomers in which there are interacted, as essential ingredients, a liquid telogen, an organometal initiator and a gaseous taxogen, and wherein the reactions which occur in said process comprise (a) chain transfer or transmetalation and (b) polymerization, and wherein the steps in which said (a) and (b) reactions are carried out are isolated to a substantial extent, the steps which comprise forming and maintaning a solution of said initiator and said telogen in a container whereby initially to metalate the telogen, passing said solution to a reaction zone in a reactor vessel, continuously passing a controlled stream of the gaseous taxogen through fine apertures into said reaction zone into direct contact with the metalated telogen solution formed in said container with the gaseous taxogen in said reaction zone, circulating the resulting intermixture containing telomer back to said container, and then recirculating the liquid mixture from said container back into said reaction zone in said reactor vessel while continuously passing gaseous 1,3-butadiene through fine apertures into said reaction zone into direct contact with said reaction intermixture to produce additional quantities of telomer.

12. The process of claim 11, in which the telogen comprises toluene, the taxogen comprises 1,3-butadiene, and the initiator is a complex of n-butyllithium and potassium t-butoxide.

13. The process of claim 11, in which the telogen comprises toluene, the taxogen comprises 1,3-butadiene, and the initiator is a complex of n-butyllithium and N,N,N',N'-tetramethylethylenediamine.

14. The process of claim 11, in which the telogen comprises toluene, the taxogen comprises 1,3-butadiene, and the initiator is a complex of dilithiodiisoprene and N,N,N',N'-tetramethylethylenediamine.

15. A telomer according to claim 1, in which the viscosity of the liquid telomer prepared by the recirculation process is from about 1/10 to about ½ that of the liquid telomer prepared by the batch process.

16. A telomer according to claim 2, in which the volatiles content of the liquid telomer prepared by the recirculation process is from about 1/10 to about ½ that of the liquid telomer prepared by the batch process.

17. A telomer according to claim 2, in which the molecular weight distribution of the liquid telomer prepared by the recirculation process is from about 10 to about 35% lower than that of the liquid telomer prepared by the batch process.

* * * * *